Jan. 20, 1953 V. G. KLEIN 2,625,954
DIAPHRAGM DEVICE
Filed Nov. 29, 1948 2 SHEETS—SHEET 1
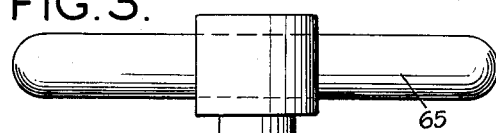
FIG. 2.
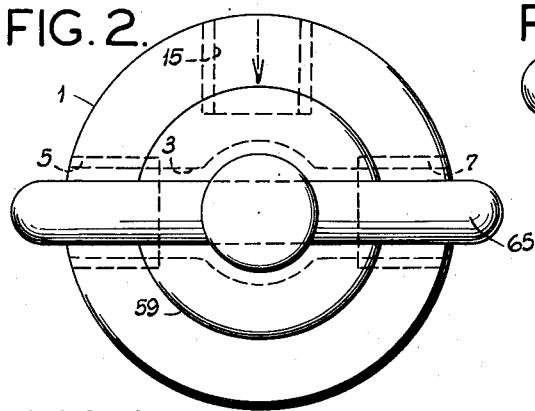
FIG. 3.
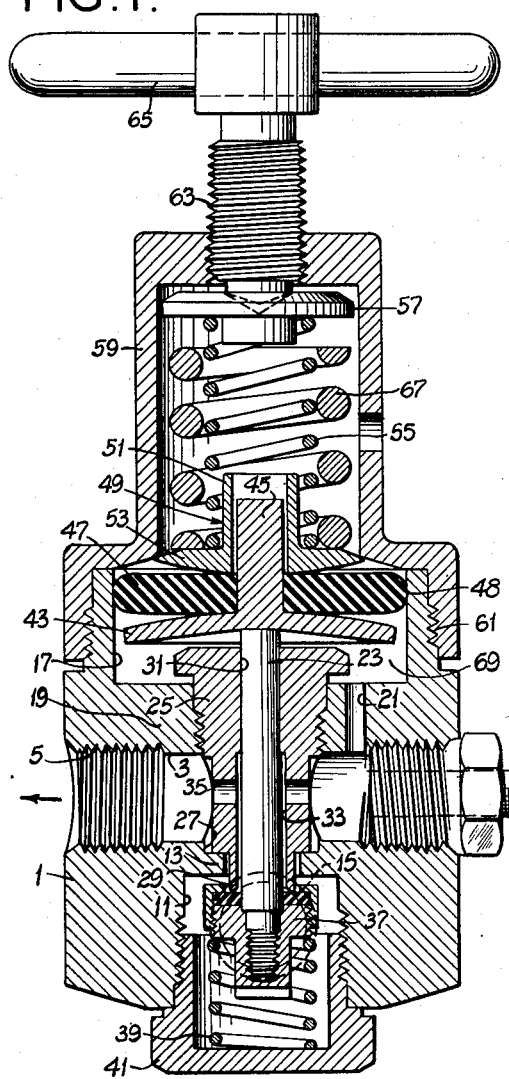
FIG. 1.
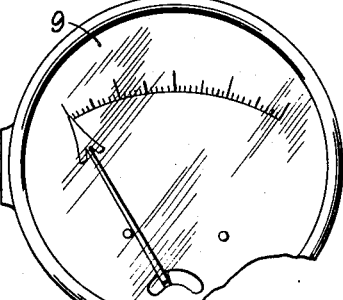
Victor G. Klein,
Inventor.
Haynes and Koenig,
Attorneys.

Jan. 20, 1953  V. G. KLEIN  2,625,954
DIAPHRAGM DEVICE
Filed Nov. 29, 1948  2 SHEETS—SHEET 2

Victor G. Klein,
Inventor.
Haynes and Koenig
Attorneys.

Patented Jan. 20, 1953

2,625,954

UNITED STATES PATENT OFFICE 2,625,954

DIAPHRAGM DEVICE

Victor G. Klein, St. Louis, Mo., assignor to Lincoln Engineering Company, St. Louis, Mo., a corporation of Missouri Application November 29, 1948, Serial No. 62,530

5 Claims. (Cl. 137—790)

This invention relates to diaphragm devices, and more particularly to devices of the class comprising a body having an opening closed by a flexible diaphragm which is subject to repeated flexing.

The invention is particularly applicable to such diaphragm devices as fluid pressure regulators, manually operated valves, fluid-controlled valves, fluid-actuated mechanical devices and the like, and its main object is the provision of an improved construction for devices of the class described which is trouble-proof and leak-proof, and which has a long useful life, also facilitating assembly and disassembly of parts.

In general, a device constructed in accordance with the invention comprises a body having an opening closed by a diaphragm, the diaphragm comprising a disc of flexible resilient material of substantial thickness having a rounded peripheral edge. The disc is fitted in the opening under sufficient radial compression to maintain the rounded peripheral edge in sealing engagement with the wall of the body in the opening, without any substantial buckling of the disc due to its thickness. The wall, in the region of the rounded edge, is formed to allow for rolling contact of the rounded peripheral edge with the wall as the diaphragm flexes. Sealing engagement is thereby maintained between the rounded edge and the wall, without any substantial sliding of the disc, and without any necessity for clamping the edge portion of the disc. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated.

Fig. 1 is a longitudinal section through a fluid pressure regulator embodying the invention, being taken on line 1—1 of Fig. 2, and illustrating the regulator in cut-off position;

Fig. 2 is a plan view;

Fig. 3 is a section similar to Fig. 1, but illustrating the regulator with parts in regulating position;

Similar reference characters indicate corresponding parts throughout the several views of the drawings.

Figure 5:
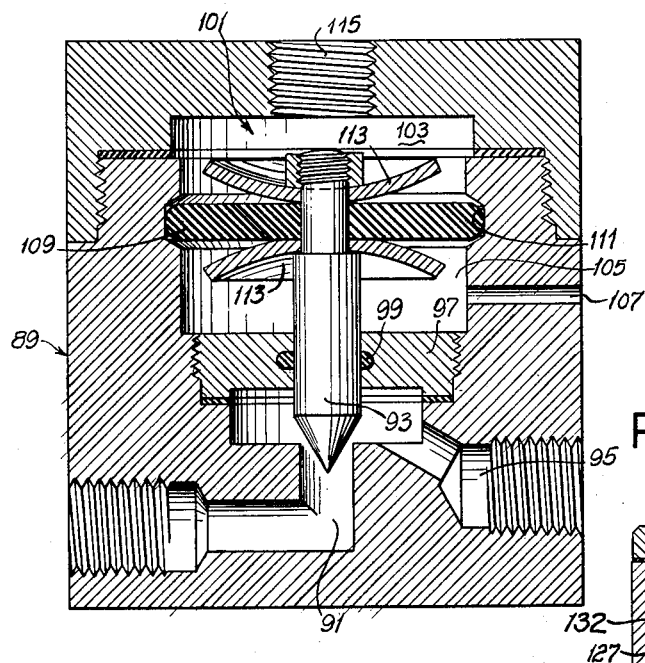
Fig. 5 is a longitudinal section through a fluid-controlled valve embodying the invention.

Prior pressure-controlled regulators, valves and the like have fallen into two broad classes in respect to the control seals used. Either these were diaphragms clamped at their edges, or floating pistons. Diaphragms are superior to pistons in that sliding friction is avoided and all leakage is in principle obviated. However, in order to obtain sensitivity, the diaphragms have been relatively thin and as a result easily subject to deterioration and leakage, particularly when non-metallic. This arose from the fact that the edge-clamping methods introduced local edge stresses which caused fatigue, cracking and leakage. Any thickening of the diaphragm designed to delay the onset deterioration reduced sensitivity. By means of the present invention, leakage and sliding friction inherent in piston type diaphragms is eliminated, while at the same time the rapid deterioraton of the clamp type of daphragm is avoided without substantial loss in operating sensitivity.

Referring to the drawings, a regulator employing this invention is shown to comprise a regulator body 1 having a lateral bore 3. One end 5 of this bore constitutes an outlet port and is threaded for connection of an outlet pipe. The other end 7 of the bore constitutes a gauge port and is threaded for connection of a gauge 9. In one end of the body 1 (its lower end as viewed in Figs. 1 and 3) is a cylindrical inlet chamber 11 which is separated from the bore 3 by a wall 13. An inlet port 15 leads into the chamber 11 from the side of the body 1 adjacent its lower end. In the other end of the body 1 (its upper end as viewed in Figs. 1 and 3) is a cylindrical recess 17 separated from the bore 3 by a wall 19. A port 21 through the wall 19 provides for communication from the bore to the recess.

A valve stem 23 is axially slidable in a headed bushing 25 which is threaded into the wall 19 from the upper end of the regulator body 1. The bushing extends across the lateral bore 3 and through an aperture 27 in the wall 13 into the chamber 11, where its lower end forms a valve seat 29. The bushing is formed with a bore 31 slidably receiving the valve stem 23, which bore is enlarged as indicated at 33. This provides an annular passage for fluid around the valve stem leading from the chamber 11 to radial ports 35 in the bushing. The ports 35 open into the bore 3. At its lower end within the chamber 11, the valve stem 23 carries a valve 37 cooperating with the valve seat 29. The valve is biased toward engagement with the valve seat by a light coil compression spring 39 in the chamber 11. The spring 39 reacts from a cap or plug 41 threaded into the outer end of the chamber 11 against the valve. The plug forms a fluid-tight closure for the chamber.

The upper end of the valve stem 23 extends out of the bushing 25 into the recess 17. Here it is engaged by the lower face of a downwardly dished disc 43 having a stem 45 extending coaxially from its upper convex face in alignment with the valve stem. A centrally apertured diaphragm 47 of relatively thick flexible resilient material such as artificial rubber or the like is plugged in the recess 17, being fairly tightly force-fitted in the recess over the disc 43, the stem 45 of the disc extending upward through the central aperture in the diaphragm. As indicated and as illustrated, the diaphragm 47 consists of a disc of rubber, preferably a synthetic rubber, or like material, of substantial thickness relative to its diameter and having a rounded edge 48 which is in tight engagement with the interior cylindrical wall of the recess 17. Overlying the diaphragm is a spring abutment 49 comprising a hollow stem 51 receiving the stem 45 and having a flange 53 at its lower end formed with a convex lower face engaging the upper face of the diaphragm.

A light coil compression spring 55 reacts against the spring abutment 49 from a spring seat 57 which is adjustable toward and away from the abutment 49 in a spring housing 59. The latter is threaded to the upper end of the regulator body as indicated at 61. A regulating screw 63, having a handle 65, is threaded through the upper end of the spring housing for driving the spring seat 57 downward against the bias of spring 55, which retains the seat against the end of the screw. Also housed in the spring housing is a heavy pressure-regulating coil compression spring 67. This spring, when fully extended, is shorter than the distance from the flange 53 of the spring abutment 49 to the spring seat 57 when the latter is retracted to its maximum extent by backing off the regulating screw 63 to its fullest extent. Consequently, when the regulating screw is backed off to its retracted position illustrated in Fig. 1, the pressure-regulating spring 67 is not under compression and has no biasing effect on the diaphragm. When the regulating screw is turned to drive the spring seat 57 far enough downward to engage and compress the pressure-regulating spring (Fig. 3), the latter reacts against the spring abutment 49 from the spring seat 57 to tend to flex the diaphragm downward.

With the regulating screw 63 backed off to a point where the pressure-regulating spring 67 is not under compression (Fig. 1), the spring 39 biases the valve 37 against the valve seat 29 to cut off flow from the inlet chamber 11 to the outlet 5. The characteristics of spring 39 in relation to the characteristics of spring 55 are such as to maintain the valve seated to cut off flow under these circumstances. To open the valve to provide for pressure-regulated flow, the regulating screw is threaded down to move spring seat 57 downward far enough to compress the pressure-regulating spring 67 (Fig. 3). This flexes the diaphragm 47 downward or inward, its rounded edge rolling with low friction on the interior wall of the recess 17. This drives the disc 43 downward, thereby driving the valve stem 23 downward and opening the valve 37. Such inward flexing of the diaphragm is limited by engagement of the disc 43 with the head of the bushing 25. Fluid (air, for example), which is under pressure in chamber 11 flows through the annular passage 33 around the valve stem 23, through the radial ports 35, and through bore 3 to the outlet 5. It also enters the space in recess 17 under the diaphragm through the port 21 in the dividing wall 19. This space thus constitutes a pressure chamber 69 closed by the diaphragm, with the latter adapted to flex in response to variations in pressure. If the pressure in the pressure chamber rises sufficiently to overcome the bias of the pressure-regulating spring 67 (which bias tends to flex the diaphragm downward and inward), the diaphragm flexes upward and outward, thereby relieving the pressure of disc 43 on the valve stem 23 and permitting spring 39 to close the valve to cut off flow. When the excessive pressure is relieved, the spring 67 again biases the valve stem downward to open the valve to reinstate flow.

Assuming that it is desired to regulate and to maintain a selected substantially constant outlet pressure, even with fluctuating inlet pressure, the regulating screw 63 is adjusted to compress the pressure-regulating spring 67 to such extent as to flex the diaphragm 47 inward to hold the valve 37 open at pressures in the pressure chamber 69 below the desired outlet pressure. If the inlet pressure should exceed this value, the increased pressure transmitted to the chamber 69 through the port 21 flexes the diaphragm outward, thereby permitting the spring 39 to close the valve 37 and cut off flow to the outlet. Thus, the outlet pressure is prevented from rising above the desired value and maintained substantially constant.

The important feature of the invention resides in the provision of a diaphragm which is substantially thick relative to its diameter and which is peripherally restrained but not clamped. This is of considerable advantage over prior constructions having thin diaphragms clamped at their peripheries. The thick diaphragm is less likely to crack and leak and hence has a prolonged useful life. At the same time, the absence of restraint at its periphery permits it to roll somewhat at this point. It will be understood that if a thick diaphragm were confined at its periphery, as by having its margin clamped, its ability to flex and sensitivity, would be impaired. By means of the present invention, a thick diaphragm may be used to attain the long-wearing attributes of such a diaphragm, without impairing the flexing ability of the diaphragm. Also, since the diaphragm is not clamped at its periphery, it is not subjected to bending and shearing forces which might cause fatigue and a tendency to weaken it. This is because the rounded periphery of the diaphragm allows for somewhat of a rolling motion of the periphery as the diaphragm flexes. It will be understood that the thickness of the diaphragm, relative to its diameter, is such that it may be tightly fitted in the recess 17 under substantial radial compression without buckling. Exemplary dimensions for synthetic rubber are 1½ inches in diameter by $\frac{5}{16}$ inch thickness. The diaphragm has no appreciable sliding movement in the recess 17 and hence is not comparable to a piston. This is due also to the relatively short stroke of the valve required for opening and closing.

A further advantageous feature is the gripping of the diaphragm between the opposed convex faces of the disc 43 and the spring abutment flange 53. This eliminates localized shearing stresses where the operating elements of the regulator engage the diaphragm. Also, the diaphragm mounting of this invention makes it easy to assemble the regulator, the only operation necessary to set the diaphragm in place being to force-fit or plug it into the recess 17 prior to threading on the spring housing 59. The assembly and disassembly of the other parts are also convenient. It will be understood that the diaphragm herein disclosed is applicable to pressure regulators other than that specifically disclosed and, in fact, to devices other than pressure regulators which embody a pressure chamber sealed by a flexible diaphragm.

Figure 4:
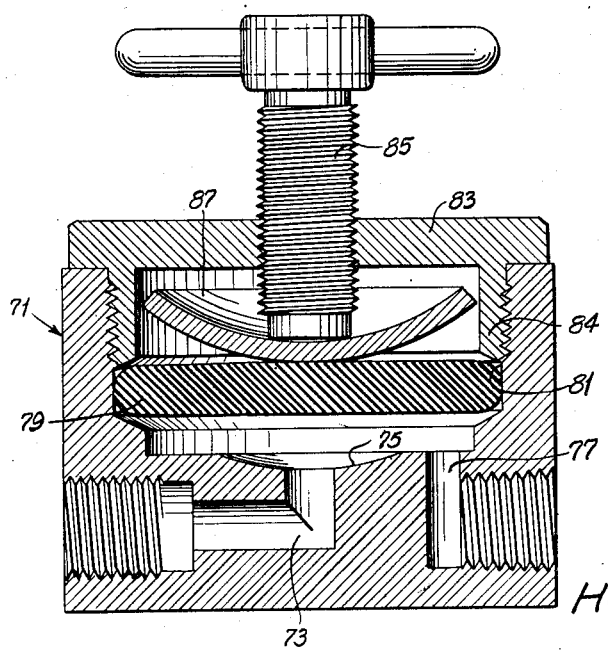
Fig. 4 is a longitudinal section through a manually operated valve embodying the invention.

In Fig. 4 is shown a manually operated valve 71 embodying the invention, in which a port 73 to be controlled is provided with a surrounding more or less spherical seat 75. A second port communicates with the port 73 as shown at 77. A relatively thick diaphragm 79 has the rolling frictional engagement with the walls of a chamber above the port 73, as already described in connection with diaphragm 47. The chamber is counterbored as shown at 81 snugly to accept the diaphragm. A closure is shown at 83, which includes an inner sleeve 84 which, with the counterbore 81, provides a containment for the diaphragm edge without binding it. Through this closure is threaded a manual control screw 85. Between the screw 85 and the diaphragm 79 is located a convex pressure plate 87. The plate 87 is adapted to push the diaphragm 79 into closing engagement with the seat 75 when the screw 85 is threaded down. Under such circumstances, the diaphragm has the stated rolling action on the circular wall of the counterbore 81.

In Fig. 5 is shown a fluid-controlled valve construction numbered 89, in which a valve port 91 is under control of a valve stem 93. A communicating port is shown at 95. The stem 93 slidingly passes through a wall 97, where it is packed as shown at 99. It passes into a chamber 101 which is divided into an upper section 103 and a lower section 105. The lower section is vented as shown at 107. The upper end of the stem 93 passes through a central hole in a diaphragm 109 made according to the invention. This diaphragm engages a circular grooved portion 111 forming a loose containment permitting substantial rolling frictional action with the edge of the diaphragm 109. The groove 111 is wide enough to prevent binding. Attached to the stem 93 and on opposite sides of the diaphragm 109 are convex abutment members 113. By admitting fluid pressure to an inlet 115, diaphragm 109 may be pushed down to close the port 91 to control flow between it and port 95. The form and action of the diaphragm 109 is as has already been described in connection with the previously described forms of the invention.

Figure 6:
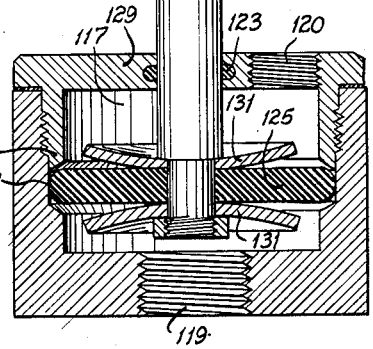
Fig. 6 is a longitudinal section through a fluid-actuated mechanical device embodying the invention.

In Fig. 6 is shown another form of the invention for a fluid-actuated mechanical device. In this case a chamber 117 is provided, having opposite fluid-controlled ports 119 and 120. A mechanical operating member 121 extends into the chamber 117 through packing 123. On its inner end, the operator 121 passes through a hole in the diaphragm 125 made according to the invention. The edges of this diaphragm engage a counterbored containment 127, the containment being large enough to permit the desired rolling frictional action. A cover 129 has an inner edge 132 which completes the containment afforded by the counterbore 127, this being non-binding. The operator 121 includes on opposite sides of the diaphragm 125 convex abutment members 131 for controlling the central action of the diaphragm to assure peripheral rolling frictional action.

In view of the above, it will be clear that the important feature of the invention is the provision of a diaphragm device characterized in having a relatively thick diaphragm which has a rounded edge providing for frictional rolling contact with a cylinder wall. Also significant is the use of the convex abutments, which, when force is applied through them to the diaphragm, constrain the diaphragm to deform in such a way that its rounded edge will have a more or less frictional rolling contact with the containment. In no case is the containment in the form of a peripheral clamp, the containment being formed to provide for the desired rolling frictional action.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:
1. In combination, a body having an opening and a diaphragm closing the opening and adapted for flexing movement therein, said diaphragm comprising a normally substantially flat disc of flexible resilient material of substantial thickness having a rounded peripheral edge and adapted, in flexing, to assume a dished form wherein its center is displaced axially with respect to its edge, said disc being fitted in the opening under sufficient radial compression to maintain the rounded peripheral edge in sealing engagement with the wall of the body in the opening, without any substantial buckling of the disc due to its substantial thickness, the edge of the disc, as fitted in the opening, retaining its rounded form, said wall, in the region of the rounded edge, being formed to allow for rolling contact of the rounded peripheral edge with said wall as the diaphragm flexes, sealing engagement being maintained between said edge and said wall without any substantial binding or sliding of the disc.

2. In combination, a chamber having a cylindrical recess and a diaphragm in the chamber closing the recess and adapted to flex therein, said diaphragm comprising a normally substantially flat circular disc of flexible resilient material of substantial thickness relative to its diameter having a rounded peripheral edge and adapted, in flexing, to assume a dished form wherein its center is displaced axially with respect to its edge, said disc being fitted in the recess under sufficient radial compression to maintain the rounded peripheral edge in sealing engagement with the wall of the chamber in the recess, without any substantial buckling of the disc due to its substantial thickness, the edge of the disc, as fitted in the recess, retaining its rounded form, said wall, in the region of the rounded edge, being formed to allow for rolling contact of the rounded peripheral edge with said wall as the diaphragm flexes, sealing engagement being maintained between said edge and said wall without any substantial binding or sliding of the disc.

3. In combination, a chamber having a cylindrical recess and a diaphragm in the chamber closing the recess and adapted to flex therein, said diaphragm comprising a circular disc of flexible resilient material of substantial thickness relative to its diameter having a rounded peripheral edge, said disc having its edge fitted in an internal annular groove in the recess under sufficient radial compression to maintain the rounded peripheral edge in sealing engagement with the wall of the chamber in the groove, without any substantial buckling of the disc due to its substantial thickness, said groove being wide enough and so formed as to allow for rolling contact of the rounded peripheral edge with said wall as the diaphragm flexes, sealing engagement being maintained between said edge and said wall without any substantial binding or sliding of the disc.

4. In combination, a chamber having a cylindrical recess and a diaphragm in the chamber closing the recess and adapted to flex therein, said diaphragm comprising a circular disc of flexible resilient material of substantial thickness relative to its diameter having a rounded peripheral edge, said disc being fitted in the recess under sufficient radial compression to maintain the rounded peripheral edge in sealing engagement with the wall of the chamber in the recess, without any substantial buckling of the disc due to its substantial thickness, said wall, in the region of the rounded edge, being formed to allow for rolling contact of the rounded peripheral edge with said wall as the diaphragm flexes, sealing engagement being maintained between said edge and said wall without any substantial binding or sliding of the disc, and a movable abutment member having a convex face engaging one side of the disc.

5. In combination, a chamber having a cylindrical recess and a diaphragm in the chamber closing the recess and adapted to flex therein, said diaphragm comprising a circular disc of flexible resilient material of substantial thickness relative to its diameter having a rounded peripheral edge, said disc being fitted in the recess under sufficient radial compression to maintain the rounded peripheral edge in sealing engagement with the wall of the chamber in the recess, without any substantial buckling of the disc due to its substantial thickness, said wall, in the region of the rounded edge, being formed to allow for rolling contact of the rounded peripheral edge with said wall as the diaphragm flexes, sealing engagement being maintained between said edge and said wall without any substantial binding or sliding of the disc, and movable abutment members on opposite sides of the disc, each member having a convex face engaging the respective side of the disc.

VICTOR G. KLEIN.

REFERENCES CITED

The following references are of record in the file of this patent:

UNITED STATES PATENTS

| Number | Name | Date |
|---|---|---|
| 700,653 | Jobson | May 20, 1902 |
| 1,514,217 | Messer | Nov. 4, 1924 |
| 1,603,112 | Jenkins | Oct. 12, 1926 |
| 2,180,795 | Christensen | Nov. 21, 1939 |
| 2,487,635 | Carpenter | Nov. 8, 1949 |

FOREIGN PATENTS

| Number | Country | Date |
|---|---|---|
| 23,833 | Great Britain | of 1893 |